(12) United States Patent
Steacy

(10) Patent No.: US 6,645,350 B1
(45) Date of Patent: Nov. 11, 2003

(54) DIVIDING WALL COLUMN FRACTIONATION TRAY

(75) Inventor: Paul C. Steacy, Mount Prospect, IL (US)

(73) Assignee: UOP LLC, Des Plaines, IL (US)

(*) Notice: Subject to any disclaimer, the term of this patent is extended or adjusted under 35 U.S.C. 154(b) by 0 days.

(21) Appl. No.: 09/883,161

(22) Filed: Jun. 15, 2001

(51) Int. Cl.[7] .................................................. B01D 3/32
(52) U.S. Cl. ..................... 202/158; 196/111; 261/114.5
(58) Field of Search ................................. 202/158, 153; 203/99, DIG. 19, 100; 196/111; 261/114.5, 109, 108, 110

(56) References Cited

U.S. PATENT DOCUMENTS

| | | | |
|---|---|---|---|
| 2,471,134 A | 5/1949 | Wright | 196/100 |
| 4,028,191 A * | 6/1977 | Scott | 202/158 |
| 4,060,399 A * | 11/1977 | Gleason | 261/126 |
| 4,230,533 A | 10/1980 | Giroux | 203/1 |
| 4,543,219 A * | 9/1985 | Yamato et al. | 261/109 |
| 4,582,569 A * | 4/1986 | Jenkins | 196/111 |
| 5,755,933 A | 5/1998 | Ognisty et al. | 202/158 |
| 5,785,819 A | 7/1998 | Kaibel et al. | 202/158 |
| 5,902,460 A * | 5/1999 | Gerhold | 203/99 |

OTHER PUBLICATIONS

Christiansen, A.C. et al. *Complex Distillation Arrangements: Extending the Petlyuk Ideas* Computers Chem Engr. vol. 21pp. S237–S242, 1997.*

Lestak, F. et al. *Heat Transfer Across the Wall of Dividing Wall Columns* TransIChemE, vol. 72, Part A, Sep. 1994, pp. 639–644.

* cited by examiner

Primary Examiner—Virginia Manoharan
(74) Attorney, Agent, or Firm—John G. Tolomei; James C. Paschall; David J. Piasecki

(57) ABSTRACT

Problems generated by heat transfer through the vertical dividing wall of a trayed "dividing wall column" and into a downcomer of a tray are mitigated by providing a separate vertical isolation wall between the downcomer and dividing wall. The isolation wall forms one side of the downcomer and is spaced a short distance outward from the dividing wall to form an isolation volume which thermally insulates the downcomer from the dividing wall. The added wall is parallel to the dividing wall and supplants the dividing wall as a part of the downcomer. It eliminates a need to insulate the dividing wall.

9 Claims, 3 Drawing Sheets

DIVIDING WALL COLUMN FRACTIONATION TRAY

FIELD OF THE INVENTION

The invention relates to the design of fractionation trays and columns used to separate volatile chemical compounds by fractional distillation. The invention specifically relates to the design and construction of the downcomers of cross flow trays of a dividing wall fractionation column.

BACKGROUND OF THE INVENTION

Fractional distillation is used to perform a large number of separations of volatile chemical compounds in the chemical, petrochemical and petroleum refining industries. Large scale commercial fractionational distillation is conducted in a vertical enclosed vessel referred to as a fractionation column.

The fractionation column will contain some form of vapor-liquid contacting device which may be in the form of packing such as random or structured packing or in the form of a fractionation tray. A fractionation tray typically comprises a large flat area referred to as the decking or contacting deck of the tray plus means to deliver liquid to the tray from the next tray above and to remove liquid for passage to the next tray below. The liquid being removed from the tray flows through a part of the tray referred to as a downcomer. Vapor generated in the lower portion of the column passes upward through perforations in the decking, while the liquid flows downward from tray to tray countercurrent to the vapor. With a cross flow type tray the liquid first enters upon a tray from the downcomer of the tray above. It then passes across the decking of the tray and finally exits through an outlet downcomer of the tray.

The material actually entering the outlet downcomer is normally in the form of a froth or a liquid containing entrained bubbles or some other form of two-phase admixture of vapor and liquid. One function of the downcomer structure is to promote the separation of entrained vapor from the liquid such that only liquid passes downward to the next tray. This is necessary for optimum performance of the column.

RELATED ART

U.S. Pat. No. 2,471,134 issued to R. O. Wright illustrates a dividing wall fractionation column having a partition or dividing wall 20 dividing the trayed column into two parallel vapor-liquid contacting chambers. A similar but more detailed disclosure of a dividing wall fractionation column is provided by U.S. Pat. No. 4,230,533 issued to V. A. Giroux. Dividing wall columns are closely related to a different type of column referred to as a partitioned distillation column such as illustrated in U.S. Pat. No. 5,755,933 issued to Thomas P. Ognisty et al. A partitioned distillation column differs from a dividing wall column in that the vertical dividing wall is positioned such that it contacts one end of the column. Thus only one terminal portion of the column is divided into the two parallel contacting sections. In this manner two overhead products or two bottom products may be removed from a single column. A dividing wall column produces an intermediate boiling fraction.

Despite the fact that the two parallel contacting chambers in the central portion of a dividing wall column are in open communication at their upper and lower ends, the conditions in these two chambers can differ. Specifically, the temperature in the two chambers may differ at the same horizontal height in the column. As the dividing wall and essentially all of the fractionation column will typically be made of metal, there exists the possibility for heat transfer from one chamber to the other. This has led to the development of dividing wall columns which have an insulated dividing wall as illustrated in U.S. Pat. No. 5,785,819 to G. Kaibel et al. This reference discloses the use of actual insulation, a vacuum or inert gases to insulate the dividing wall.

The effect of heat transfer across the wall of dividing wall columns was investigated in a paper presented by F. Lestak et al., published at page 639–644, of TranslChemE, Vol. 72, Part A, September 1994. This paper indicates that horizontal heat transfer through the dividing wall may be beneficial or detrimental to the separation which is performed in the column. It suggests that insulation can be applied to the portion of the dividing wall where the heat transfer is detrimental. Where heat transfer is beneficial, it can be promoted or enhanced as by the use of fins, heat pipes, etc.

BRIEF SUMMARY OF THE INVENTION

In prior art dividing wall column cross flow trays the dividing wall has been used as the back wall of the downcomers located near the center of the column. The invention is a new design for the downcomers of cross flow fractionation trays used in the divided section of a dividing wall column. The novel design of the subject invention mitigates localized heat transfer through the dividing wall which can vaporize some of the liquid present in the downcomer of the tray. The formation of vapor in the downcomer interferes with fluid flow through the downcomer and the separation of vapor and liquid within the downcomer. The subject invention adds a parallel isolation wall which separates the downcomer from the dividing wall thus providing thermal insulation and reducing vaporization in the downcomer. It eliminates a need to insulate the entire dividing wall.

A broad embodiment of the invention may be characterized as a cross flow tray for performing fractional distillation in a dividing wall fractionation column, the column comprising a central dividing wall and having a curved inner surface, which tray comprises perforated decking occupying at least a central portion of the tray and defining the contacting level of the tray; a liquid receiving area located on a first side of the tray, the first side of the tray being curved to generally conform to the inner surface of the column; an outlet weir projecting upward from the contacting level of the tray along a chord across the tray to define an inlet of a downcomer located on the second side of the tray opposite from the liquid receiving area, and an isolation wall located between the weir and the dividing wall, the isolation wall being substantially parallel to the weir and extending downward from the contacting level of the tray to the outlet of the downcomer, the wall being offset from a substantially linear edge of the tray, which linear edge generally conforms to the dividing wall, to define an isolation volume located between the dividing wall and the isolation wall.

DETAILED DESCRIPTION AND PREFERRED EMBODIMENTS

Figure 1:
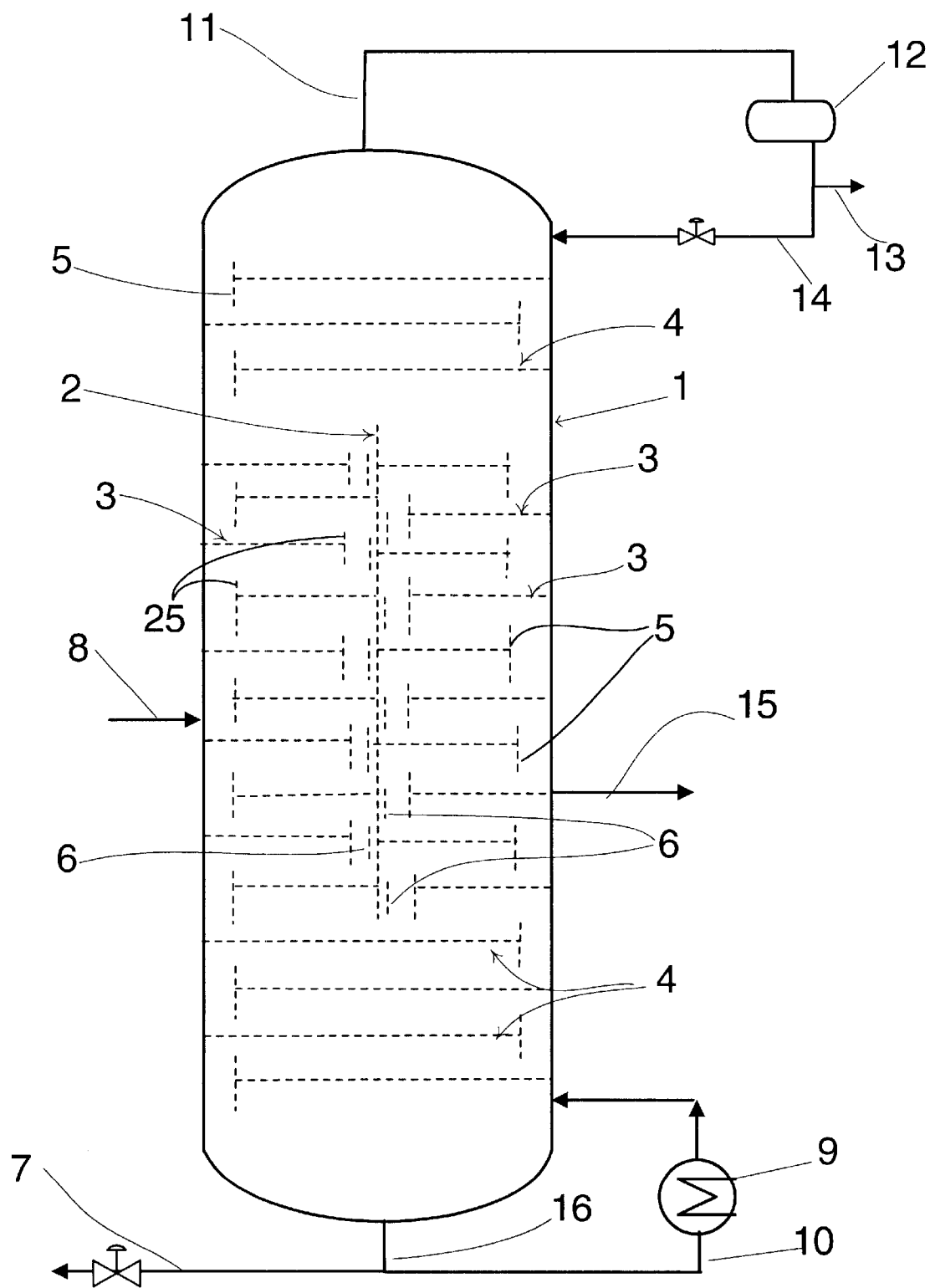
FIG. 1 is a simplified side view of a dividing wall fractionation column.

As previously mentioned, fractionation columns find a large utility in many industrial processes. A conventional fractionation column is employed to separate an entering feed stream into two fractions. These are referred to as the overhead and bottoms fraction, with the overhead fraction being the lighter or more volatile components of the feedstream The feedstream may comprise only two components which are separated into high purity streams within the fractionation column. In this instance the overhead stream and the bottoms stream would each be rich in one of the two components of the feedstream. In many instances, however, the feedstream contains three or more compounds and in the instance of petroleum refining processes, the feedstream may contain 100 or 200 or more separate volatile chemical compounds. These mixtures are typically divided by boiling point range into fractions which may each contain numerous different volatile compounds.

In order to separate a feedstream comprising three compounds into single product streams, each rich in one of the, compounds with conventional columns it is necessary to employ two such fractionation columns. The first fractionation column would form a product stream having a high content of either the lightest or heaviest desired component of the feedstream and a second product containing the remaining components. The second product is then passed into a second fractionation column to divide this second product into two other product streams. It was recognized approximately 50 years ago that these two columns can, in some instances, be integrated into a single column with beneficial reductions in utilities and capital cost. This evolved through energy coupling and then mechanical integration of the columns to yield what is today referred to as "dividing wall" columns. The lower capital and operating costs of dividing wall columns has now been recognized and they are being employed with increasing frequency in the petrochemical and petroleum refining industries.

As previously mentioned, a prime function of the downcomer of a fractionation tray is the separation of the mixed phase material. ("froth") which enters the downcomer into "clear liquid" and vapor, with the vapor being released through the inlet at the top of the downcomer and the clear liquid being carried down to the next lower tray. Vapor present above the tray has contacted the liquid on the tray and should be in equilibrium with it. There is no need to recontact the vapor with the liquid. Entrainment of vapor into the liquid being passed to the next lower tray decreases the performance of the tray and, therefore, of the column. Hence entrainment of vapor into the liquid is undesirable.

The prior art cited above indicates that it has been recognized that the transfer of heat through the dividing wall can have beneficial or detrimental affects to the separation which is being performed. This recognition, however, has apparently been confined to the overall affect of the heat upon the overall fractionation step performed in the column. That is, the effect of heat transfer through the entire dividing wall has been viewed as a source of reboiling or condensation which can promote or detract from the overall separation. It is believed that the prior art does not include a recognition that the transfer of heat through the dividing wall can have an impact upon the vapor and liquid separation which is to be performed in a downcomer of a cross flow fractionation tray. Nor does the art suggest a specific solution to this problem. The liquid in the downcomer is close to its boiling point and any small input of heat into the liquid can cause the formation of vapor within the downcomer. Vapor takes up an increased volume and tends to rise through the downcomer countercurrent to the desired liquid flow. It thus tends to interfere with the separation which should be performed in the downcomer. This can lead to a reduction in the efficiency of to the column and can result in a need to increase the size of the downcomer to prevent flooding. This problem can occur in dividing wall columns in which the dividing wall forms a portion of the downcomer, such as those with cross flow trays. It is, therefore, an objective of the subject invention to minimize the vaporization of liquid in the downcomers of cross flow dividing wall columns. It is a specific objective to minimize the transfer of heat through the dividing wall of a fractionation column into a downcomer of a cross flow fractionation tray. Insulating the entire dividing wall or a large portion of the wall as suggested by the cited references will reduce heat transfer into one chamber of the column. However, this may not be required or even desired. The subject invention has the advantage of not requiring such extensive insulation or structure. The insulating effect of the dividing wall is localized to the area where it is most needed. It can also be installed as part of a revamp or modification to an existing dividing wall column.

The objective of the subject invention is achieved by providing an isolation wall adjacent to the dividing wall and forming a narrow isolation chamber which will act to insulate the downcomer from the warm surface of the dividing wall.

This added isolation wall is preferably a planar wall which is parallel to the dividing wall. It is most effective when the weir of the outlet downcomer is parallel to the.dividing wall. This isolation wall preferably extends sideways from the active area of the tray to the internal surface of the column and upward to the decking or other item forming the lower surface of the tray to thereby totally enclose the sides and top of the isolation volume. The isolation wall preferably does not extend above the decking. The forth and vapor above the decking may therefore directly contact the dividing wall.

Referring now to FIG. 1, there is shown a simplified sideview of a dividing wall fractionation column including only the primary internal components of this column. The drawing is not to scale and is only intended to be a nonlimiting illustration of the overall arrangement and construction of the components of the invention. A feedstream enters the fractionation column 1 through line 8 and is divided into the less volatile components which descend downward in a liquid phase and more volatile components which pass upward. This separation occurs on the left hand of side of the dividing wall 2, which divides the internal cylindrical volume of the column 1 into the parallel separation chambers. The feedstream is passed into the receiving or feed chamber on the left hand side of the column and an intermediated product stream is removed through line 15 from the product chamber on the right hand side of the dividing wall 2.

Both the upper and lower ends of the two parallel contacting chambers are open to respective portions of the column. Therefore, vapor may pass upward out of the receiving chamber of the column and into the upper portion of the column, which contains a plurality of full diameter fractionation trays 4. These full diameter trays 4 are illustrated as being single-pass cross flow trays which means that liquid passes from one side of the tray to the other before entering a downcomer and flowing onto the next lower tray. The downcomers of the trays 4 are formed by the downcomer end wall 5, which extends above the decking of the tray to form an outlet weir 25, and extends downward below the decking, which defines the level of the tray, to form a confined volume which allows the vapor and liquid to separate within the downcomer. Typically the bottom edge of the downcomer end wall 5 is a short distance from the level of the next lower tray. A portion of the liquid collected from the lowermost full fractionation tray 4 of the upper portion of the column will be fed to the product contacting chamber on the right hand side of the dividing wall at a controlled rate by a means not shown and not relevant to the invention. A second portion is passed into the top of the receiving chamber. The methods used to collect and apportion the liquid between the two contacting chambers of the column does not form part of the subject invention and is, therefore, not illustrated. It may be of conventional design. At the top of the column a vapor stream comprising the total overhead vapor of the column is removed in line 11 and passed through an overhead condenser not shown to form a liquid phase collected in the overhead receiver 12. The overhead liquid is removed and divided into a first portion removed from the column through line 13 as a net overhead product and a second portion which is returned to the column through line 14 as reflux.

In a manner analogous to the top portion of the receiving chamber liquid drains from the bottom portion of the receiving chamber of the column into the full width fractionation trays 4 located in the bottom portion of the column. This liquid is subjected to fractional distillation on these trays leading to the formation of a bottoms liquid stream removed from the column through an outlet leading to the transfer line 16. The bottoms stream is divided into a net bottoms stream removed through line 7 and a second stream passed into line 10 and through the reboiler 9 to add heat to the bottom portion of the column. The heat added by this reboiling forms vapor which passes upward through the trays 4 and enters the bottom of the receiving chamber. Vapor also rises into the product chamber located on the right hand side of the dividing wall 2. Therefore, vapor enters the bottom of the product chamber and liquid enters the top of the product chamber. This generates the countercurrent flow necessary for fractional distillation within the product chamber. The receiving chamber and the product chamber are both illustrated as containing limited cross flow fractionation trays 3. These trays 3 are smaller in cross-sectional area than the full trays 4. They will have a chordal shape with the chord being formed by the dividing wall 2, which can be off-center such that the cross-sectional area of either the product or receiving chamber can be greater. FIG. 1 further illustrates the provision of the isolation walls 6 parallel to the dividing wall 2 and forming open bottomed isolation chambers between the dividing wall and the downcomer volume.

Figure 2:
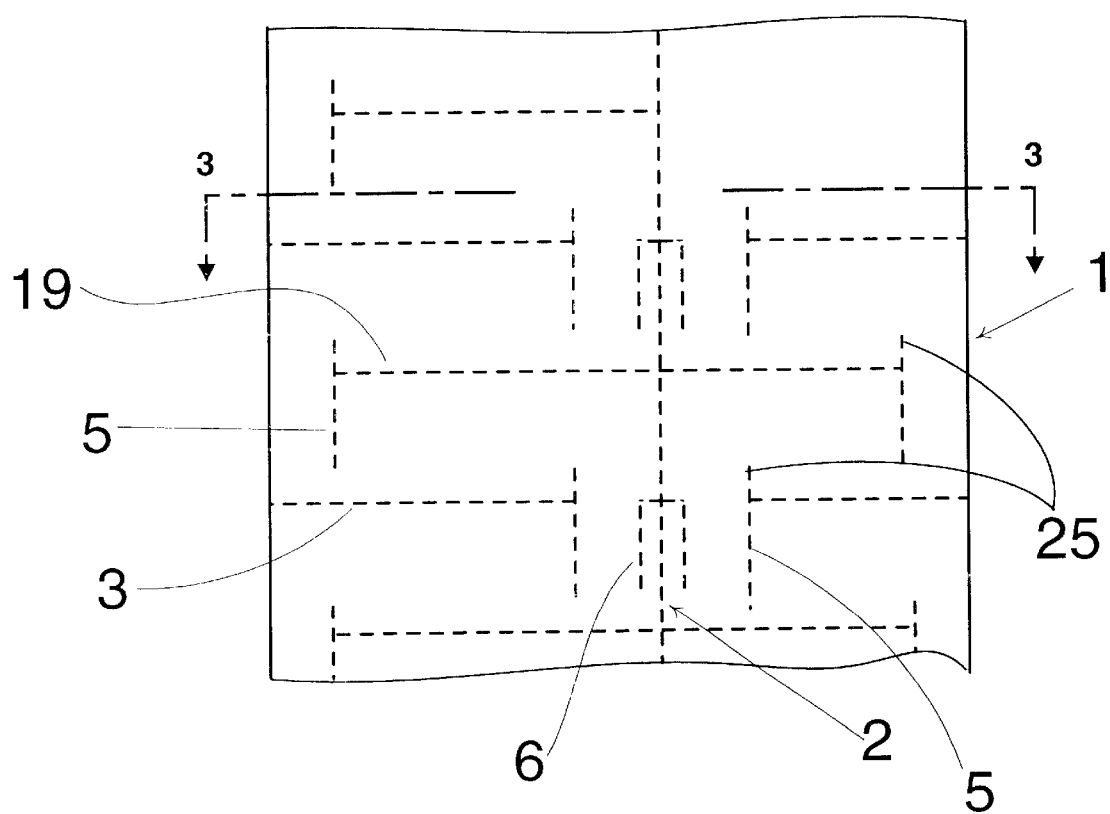
FIG. 2 is an enlarged view of a portion of the column of FIG. 1, illustrating in greater detail the structure of the subject apparatus.

FIG. 2 presents in greater detail the structure of the cross flow trays employed in the divided section of the column. Each limited area fractionation tray 3 is formed from two major components. These are the decking 19 and the downcomer wall 5. The decking will extend from either the dividing wall 2 or the inner surface of the column 1 to the opposing downcomer inlet. This alternates between trays depending on whether the outlet downcomer is nearest the dividing wall or the vessel wall. The structure of the trays, therefore differs on the vertically alternate trays. The direction of liquid flow on the subject trays, therefore, resembles that shown in FIG. 2b of the previously cited U.S. Pat. No. 5,755,933 and is transverse to the dividing wall. The liquid flow may alternatively be in a direction parallel to the dividing wall. In this case the downcomer is perpendicular to the dividing wall. The subject invention may also be employed with parallel liquid flow although the surface area of the downcomer in contact with the dividing wall is much reduced in that embodiment. The subject invention has its greatest beneficial effect when the downcomer extends parallel to the dividing wall as shown in the figures.

FIG. 2 illustrates that the isolation walls 6 are parallel to the downcomer end walls 5 and form a closed-top volume adjacent to the surface of the dividing wall. In FIG. 2 the isolation walls 6 are shown as being provided for the downcomers located on both sides of the dividing wall 6. It is, of course, not normally necessary to utilize the invention in this manner since only one chamber will be hotter than the other. The isolation wall 6 would be provided in only one of the contacting chambers of the dividing wall portion of the column. However, if the trays in the two chambers are not aligned vertically, then use of the walls 6 on both sides of the dividing wall may be useful. Alternatively, they may be employed only in portions of one or both chambers. They may, for instance, be employed at different elevations within the column.

It is again pointed out that the drawing is not to scale and the horizontal distance between the dividing wall 2 and the isolation wall 6 may be much smaller than appears from the drawing. A distance on the order of about 1 to 2 centimeters is believed sufficient in most instances with the distance possibly extending upward to about 5 centimeters. A small spacing is preferred on the basis of process considerations, but a larger spacing is easier to construct.

The implementation of the subject invention does not require a departure from the normal design practices for fractionation columns. Therefore, the design of the rest of the fractionation tray and the column can be of a conventional nature.

Figure 3:
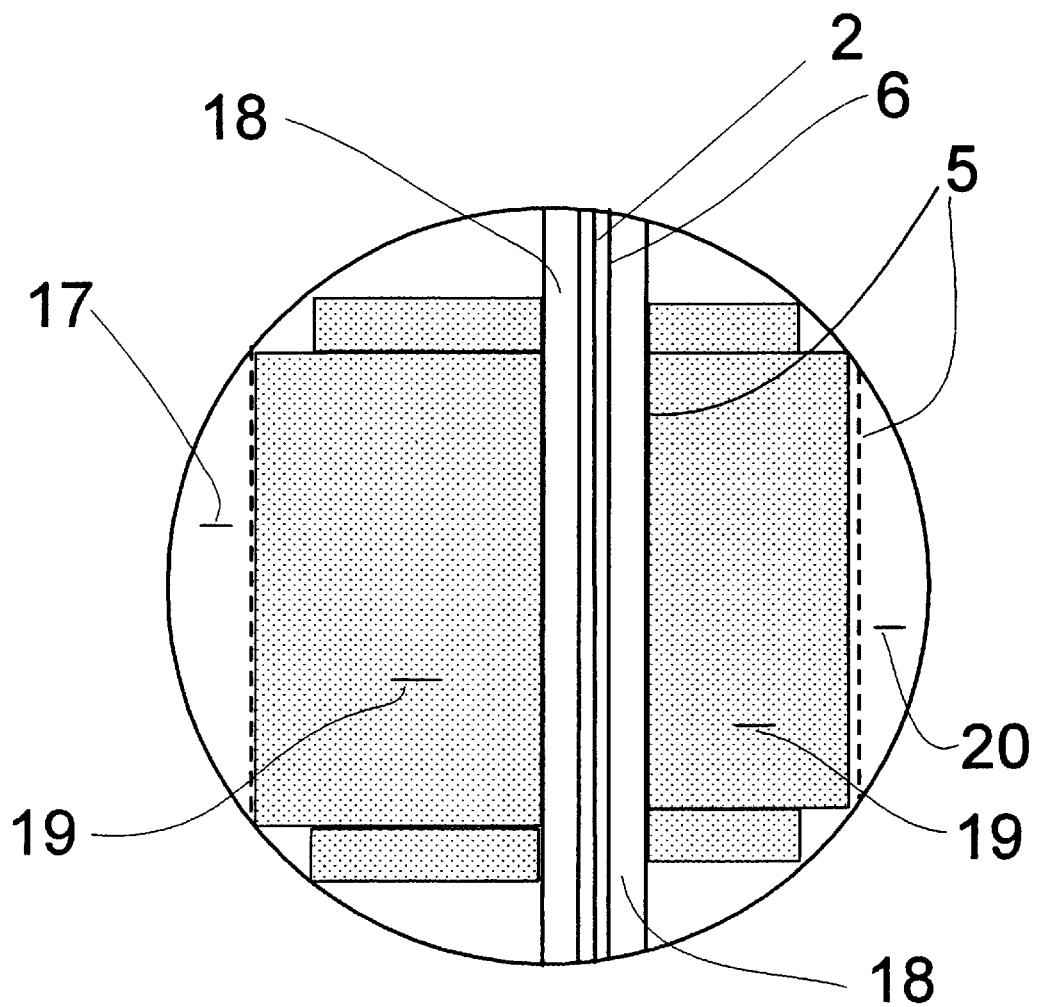
FIG. 3 is an overhead view taken along the section line marked in FIG. 2 showing the two adjacent contacting chambers located on opposite sides of dividing wall 2.

FIG. 3 is presented to ensure a thorough understanding of the structure of the subject invention. The figure presents the view seen when looking downward into the central (divided) portion of the column. The dividing wall 2 is located in the center of a band of structural elements extending across the column. On each side of the dividing wall 2 there is a parallel isolation wall 6. The isolation wall forms an isolation volume between the dividing wall 2 and the isolation wall 6. Again it is pointed out that while the Figure shows the provision of two isolation walls 6, only a single wall may be all that is required. On the opposite side of the isolation wall 6 is the downcomer volume 18 which connects the contacting chamber of the tray shown in the drawing with the contacting chamber of the next lower tray. This is an open volume through which the liquid will descend to the inlet area of the next lower tray. A substantially imperforate downcomer wall 5 forms the wall of the downcomer located furthest from the dividing wall 2. A second downcomer wall 5 shown at the edge of the tray is for the tray located immediately below. This second, chordal downcomer is shown by the section line forming a smaller chord near the receiving pan of the tray. The receiving pan forms the receiving area of this tray. It may be the decking 19 is provided in the form of several pieces of decking having a uniform pattern of small perforations which allow the upward passage of vapor.

Referring now to the tray structure shown on the right hand side of FIG. 3, when the tray is in operation, liquid would fall upon the imperforate receiving pan 20 which is located immediately below the downcomer from the tray next above. The liquid then flows to the left across the decking 19 on which it is contacted with rising vapor. The liquid then flows over the upper edge of the downcomer wall 5 and enters the upper opening of the outlet downcomer. The entering froth separates into clear liquid and vapor, with the vapor being released to flow upward into the volume above the decking 19. Vapor which has passed through the decking 19 is changed somewhat in composition. It continues to rise upward through the column by passing through the decking of the next higher tray.

An embodiment of the invention installed in a fractionation column may be characterized as a dividing wall fractional distillation column which comprises an outer vessel comprising a cylindrical wall enclosing an internal cylindrical volume, the outer vessel being aligned in a vertical direction when in use, a dividing wall extending vertically through a central portion of the internal cylindrical volume and dividing the cylindrical volume into first and second adjacent vertical vapor-liquid contacting chambers, vertically spaced apart cross flow fractionation trays located within the first vapor-liquid contacting chamber, with the fractionation trays comprising outlet downcomers located on alternating sides of horizontal decking which forms a central portion of the fractionation trays, the alternating location of the downcomer outlets dividing the alternating trays into those having wall-side outlet downcomers located proximate the dividing wall and those having far side downcomers located against the cylindrical wall of the outer vessel, vertical isolation walls which are parallel to the dividing wall and set apart from the dividing wall by a positive distance and extending downward from said alternate trays having wall-side outlet downcomers to providing a fluid retaining volume located between the isolation wall and the dividing wall, and an inlet for feeding a process stream into the column outlets for removing overhead and bottoms product streams from the column and an outlet for removing an additional product stream from the column.

What is claimed:

1. A cross flow tray for performing fractional distillation in a dividing wall fractionation column, the column comprising a central dividing wall and having a curved inner surface, the central dividing wall defining adjacent first and second vapor-liquid contacting chambers, said tray comprising:
   a.) perforated decking occupying at least a central portion of the tray and defining a contacting level of the tray;
   b.) a liquid receiving area located on a first side of the tray;
   c.) an outlet weir projecting upward from the contacting level of the tray which defines an inlet of a downcomer located on a second side of the tray opposite from the liquid receiving area; and
   d.) an isolation wall located between the downcomer and the dividing wall, the isolation wall being substantially parallel to the dividing wall and extending downward from the contacting level of the tray toward the outlet of the downcomer, the isolation wall being offset from a substantially linear edge of the tray, which linear edge generally conforms to the dividing wall, to define an isolation volume located between the dividing wall and the isolation wall.

2. The tray of claim 1 wherein the isolation volume has upper and side portions which are sealed to the inner surface of the column in a manner which substantially prevents upward vapor flow from the isolation volume.

3. The tray of claim 1 wherein the outlet weir is substantially parallel to the dividing wall.

4. The tray of claim 1 wherein the isolation volume has an unsealed lower surface.

5. A dividing wall fractional distillation column which comprises:
   a.) an outer vessel comprising a cylindrical wall enclosing an internal cylindrical volume, the outer vessel being aligned in a vertical direction when in use;
   b.) a dividing wall extending vertically through a central portion of the internal cylindrical volume and dividing the central portion into adjacent first and second vapor-liquid contacting chambers;
   c.) vertically spaced apart cross flow fractionation trays located within the first vapor-liquid contracting chamber, with the fractionation trays comprising outlet downcomers located on alternating sides of horizontal decking which forms a central portion of the fractionation trays, the alternating location of the downcomers dividing the trays into those having wall-side outlet downcomers located proximate the dividing wall and those having far side downcomers located against the cylindrical wall of the outer vessel;
   d.) vertical isolation walls which are parallel to the dividing wall and spaced apart from the dividing wall and extend downward from trays having wall-side outlet downcomers, the isolation walls forming a portion of the downcomer of the trays and providing a fluid retaining isolation volume located between the isolation wall and the dividing wall; and,
   e.) an inlet for feeding a process stream into the column, outlets for removing overhead and bottoms product streams from the column and an outlet for removing an additional product stream from the column.

6. The column of claim 5 wherein the outlet for removing the additional product stream communicates with the second vapor-liquid contacting chamber.

7. The column of claim 6 wherein the isolation walls are located in the first vapor-liquid contacting chamber.

8. A cross flow tray for performing fractional distillation in a dividing wall fractionation column, the column comprising a central dividing wall and having a curved inner surface, the central dividing wall defining adjacent first and second vapor-liquid contacting chambers, said tray comprising:
   a.) perforated decking occupying at least a central portion of the tray and defining a contacting level of the tray;
   b.) a liquid receiving area located on a first side of the tray;
   c.) a downcomer end wall extending at least downward from the contacting level of the tray which defines an inlet of a downcomer located on a second side of the tray opposite from the liquid receiving area; and
   d.) an isolation wall located between the downcomer and the dividing wall, the isolation wall being substantially parallel to the dividing wall and extending downward from the contacting level of the tray, the isolation wall being offset from an edge of the tray to define an isolation volume located between the dividing wall and the isolation wall, the isolation volume having upper and side portions which are sealed in a manner which substantially prevents upward vapor flow from the isolation volume.

9. The cross flow tray of claim 8 wherein the cross flow tray is located inside a dividing wall fractionation column.

* * * * *